UNITED STATES PATENT OFFICE.

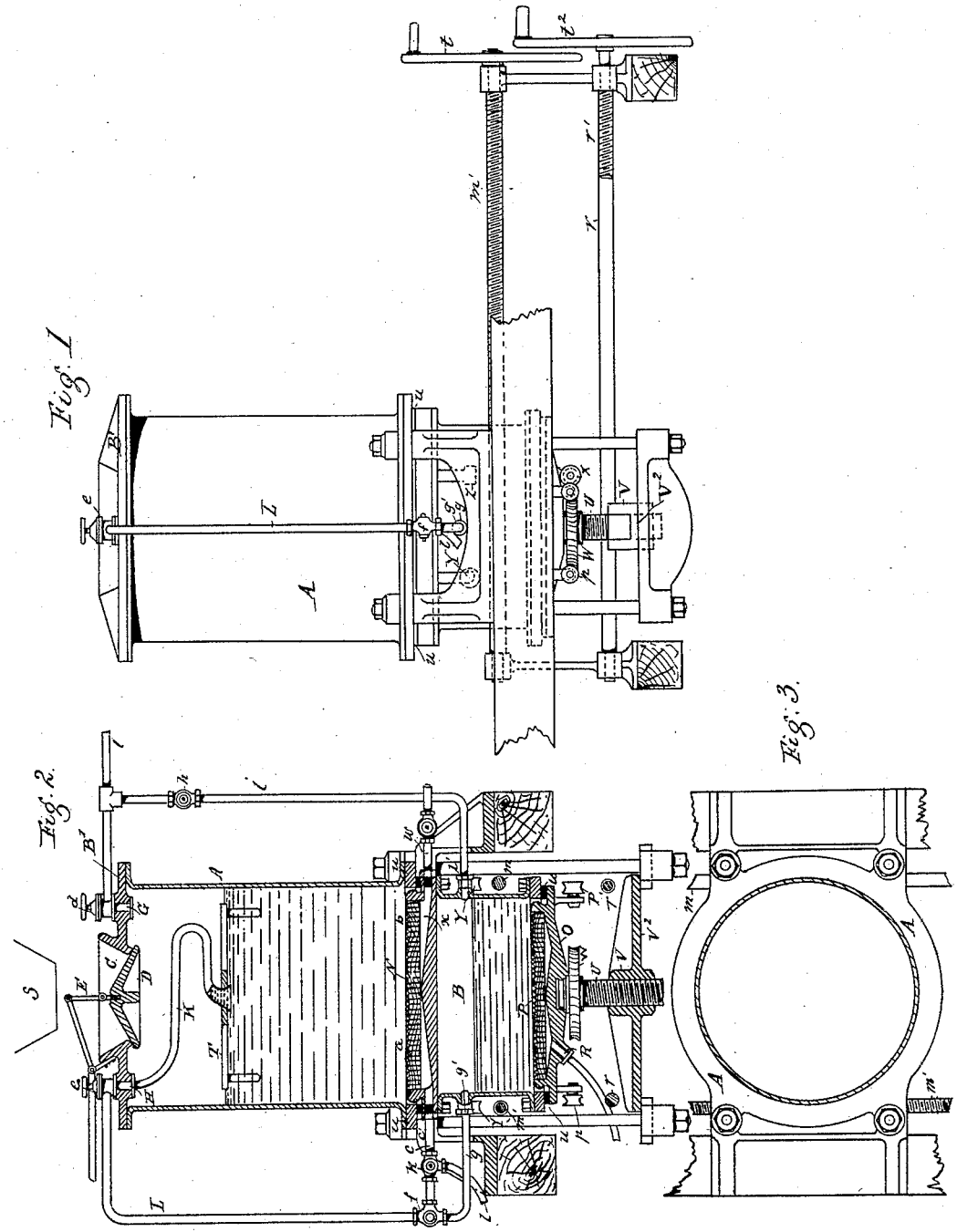

DONALD DENNES, OF DENVER, COLORADO, ASSIGNOR OF ONE-HALF TO ROBERT H. THORBURN, OF CHICAGO, ILLINOIS.

LEACHING-VAT FOR SEPARATING PRECIOUS METALS FROM THEIR ORES.

SPECIFICATION forming part of Letters Patent No. 463,120, dated November 10, 1891.

Application filed November 18, 1890. Serial No. 371,876. (No model.) Patented in England February 12, 1890, No. 11,788.

*To all whom it may concern:*

Be it known that I, DONALD DENNES, a subject of the Queen of Great Britain, residing at Denver, in the county of Arapahoe and State of Colorado, have invented certain new and useful Improvements in Leaching-Vats for Separating Precious Metals from their Ores, (for which I have obtained Letters Patent in England February 12, 1890, No. 11,788,) and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention has for its object to provide improved means for obtaining precious metals from their ores by what is commonly known as a "wet process," and is especially designed for use in connection with the wet chlorination, bromination, or any other hydrometallurgical process for extracting precious metal.

According to this invention the leaching-vat in which the liquid matter is separated from the solid refuse matter consists of a vessel provided with a removable bottom, constructed as hereinafter described. This vessel is closed at the sides and top, except that there is provided in the top a valve or valves for the admission of the material to be treated, this valve being counterweighted to cause it to be held up to its seat, except when depressed to admit of the introduction of a charge, so that when air or other fluid-pressure is applied the valve is automatically closed. If desired, a man-hole and cover may be provided in place of the valve for the introduction of the material to be treated. The pipe or pipes for admission of air or the like under pressure may also pass through the top of the vat. The matters to be treated in their mixed state as they come from the mixing vessel may be charged into the hopper or entrance to this leaching-vat in any convenient manner. This vat is connected by lugs and tie rods or bolts and nuts to the frame of a raising and lowering device below—such, for example, as a hydraulic ram or a screw-forcing device adapted to raise and lower the bottom of the vat into and out of contact with the lower edges of the vat. Elastic packing is interposed between the abutting parts of the apparatus to insure tight joints. The removable bottom is provided with wheels, which, when the bottom is lowered, come onto rails, on which the bottom may then be run from beneath the vat. This removable bottom carries a filtering-bed, which may consist of wood with grooves in the surface and having perforations through which liquids can pass into a chamber below. The surface of the wood is preferably covered with canvas to prevent the passages or perforations being clogged with the gritty matter. On this floor of wood graded sand may be laid, coarser grades being below and fine above, and over the whole may be laid sacking or canvas or similar protecting porous material to prevent displacement of the sand. The liquid portion of the material is forced through the filter-bed by the fluid-pressure admitted into the vat, the liquid passing thence by a pipe (provided with a valve to control the flow) into another vessel, preferably formed in the removable bottom of the vat and provided with a removable bottom containing a filter-bed similar to that last described. From the latter vessel the liquid holding the precious metals in solution is led away for precipitation by known methods, and in order that my said invention may be fully understood I shall now proceed more particularly to describe the same, and for that purpose shall refer to the several figures on the annexed sheet of drawings, the same letters of reference indicating corresponding parts in all the figures.

Figure 1 is a side elevation, and Fig. 2 a vertical section, of a leaching-vat or separating-vessel constructed according to this invention, and Fig. 3 is a plan of the same.

The body of this vat or vessel consists of a cylinder A, of cast-iron or other suitable material, preferably lined with lead and mounted on beams or other suitable supports, so as to leave a space below to admit of the discharge of the refuse material through the bottom of the vessel, as hereinafter described. The top of this cylinder is closed by means of a cover B', having an opening C therein, through which the material, after having been treated in a mixing-vessel, is fed in any convenient manner. The opening C is closed by an inwardly-opening valve D, connected to a lever E, carrying at its outer end a counter-weight tending to maintain the valve D against its seat. In the cover B' are passages G and H, one of which G is in communication with a pipe I, through which compressed air or other fluid may be forced into the vessel. The other passage H is connected with pipes K and L, through which slime is discharged from the vessel. The vessel is provided with a hollow removable bottom constituting a vessel or chamber B, into which the solution from the vessel A is conducted to be further treated, as hereinafter described. In the upper surface of this removable bottom a recess is provided for the reception of a filter-bed N, which may consist of graded sand, but is preferably made of wood, with grooves or channels $a$ in the upper surface and perforated with a number of holes $b$, through which the more fluid portion of the solution in the vessel A passes into a passage or a pipe $c$, by which it may be conducted into the chamber or vessel B or into other suitable receptacles placed in position to receive it. The vessel B is also provided with a removable bottom O, containing a filter-bed P, through which the solution in the vessel B is forced, and thence through a passage R into precipitating vessels or pressers to obtain the precious metals therefrom by known means. The mixed material from a mixing-vessel is fed into a hopper S, and is conducted therefrom onto the valve D which by the weight of the material thereon is caused to descend and discharge the material into the vessel A, the valve being then immediately raised by the counterweighted lever F, so as to again close the opening C. When sufficient material has been fed into the vessel A, time is allowed to admit of the gritty or solid portion of the mixture to settle, after which the cock or valve $d$ in the pipe I is opened to admit air or other fluid under pressure into the vessel A, the cock or valve $e$ and the cock $f$ in the pipe L being also opened, so that the pressure of air acting on the mixture the top stratum or slimy portion thereof is forced through the flexible pipe K and past the valve $e$ into the pipe L, whence it passes by the cock $f$ and pipe $g$ into the vessel B to be further treated.

When the charge contained in the vessel A is sufficiently cleared of its top stratum of slime, the valve $e$ and the cock $f$ are closed and the cock $h$ in the branch pipe $i$, leading from the pipe I into the vessel B, is opened, so as to admit through the said branch $i$ fluid-pressure into the vessel B. The fluid-pressure then acting on the surface of the mass in both vessels A and B will force the liquid portion through the filter-beds P and N, whence it flows through the pipes $l$ and R into suitable receivers or direct to the precipitating-presses to precipitate the precious metals therefrom. To the mouth or entrance to the flexible pipe K is attached a float T, which floats on the surface of the material in the vessel A, and so maintains the mouth of the pipe in contact therewith and insures the slimy matter entering therein when acted upon by the fluid-pressure. If the solution which has passed through the filter-bed N is not sufficiently clear, it may be conducted by cocks $k$ and $f$ and the pipe $g$ into the vessel or chamber B to be again filtered. The solution having been subjected to the fluid-pressure in the vessel B the desired length of time, the cock $h$ in the pipe $i$ is closed and the pipes $c$, $g$, and $i$ are disconnected at $c'$ $g'$ $i'$ from the vessel B, after which the said vessel comprising the bottom of the vessel A may be lowered and withdrawn, so as to allow the refuse material to discharge therefrom. In like manner the underneath portion or bottom O of the vessel B may also be lowered and withdrawn from the part B, so as to permit of the removal therefrom of any slime that may have accumulated therein.

Any suitable mechanism may be employed for effecting the lowering and raising of the removable bottom—such, for example, as a hydraulic ram arranged beneath the vessel. In the drawings I have illustrated a convenient arrangement consisting of a screw U, working in a nut V in a cross-head $V^2$, and having fast thereon a worm-wheel W, with which gears a worm X, operated by hand or by power, as most convenient. By turning the worm in one direction rotation will be given to the screw, so as to cause it to descend in the nut, the vessel or chamber B descending therewith until the wheels Y and half-nut Z, carried by the said vessel, rest upon the rods or spindles $m$ $m'$, after which, by continuing the motions of the screw in the same direction, the bottom O of the vessel or chamber B will descend until the wheels $p$ and half-nuts thereon (not shown in the drawings but similar to that marked Z) rest upon the rods or spindles $r$ $r'$. The half-nuts engage screw-threads on the spindles $m'$ and $r'$, so that upon rotating these spindles in one direction by means of the hand-wheels $t$ $t^2$ the vessel B may be withdrawn from beneath the cylinder A and the bottom O, together with the cross-head $V^2$, may be withdrawn from beneath the vessel or chamber B and admit of a free discharge of the refuse material from the said vessels. The refuse material having been discharged from the vessels and from the surface of the filter-beds, the rods or spindles $m'$ $r'$ are turned in the reverse direction, so as to return the bottom O, together with the cross-head $V^2$ and the vessel or chamber B, to beneath the cylinder A, and then by turning the screw U in the reverse direction to that in which it was turned for lowering the bottom the bottom O will be first raised into contact with the vessel or chamber B, and then by the continued rotation of the screw in the same direction the chamber B will be elevated into position against the lower edge of the cylinder A. A packing of india-rubber or other suitable yielding material, as shown at $u$, is interposed between the chamber B and the cylinder $A^3$ and also between the chamber B and its removable bottom O to make fluid-tight joints at these parts.

The removable bottoms of the vessels A and B having been replaced and the pipes $c$, $g$, and $i$ again connected to the vessel B, a fresh charge of mixed material is fed into the vessel A, and the operations, as hereinbefore described, are repeated.

$w$ is a pipe connected to the space $x$ between the filter-bed N and the bottom of the recess in which it rests, through which pipe water may be poured into the space and through the filter-bed when desired for the purpose of cleaning the filter and for washing and disturbing or agitating the ore in the vessel A.

Having thus described my invention, what I claim is—

An ore-leaching apparatus consisting of a closed vat or separating-vessel having a removable bottom carrying a filter-bed in its upper portion and an auxiliary chamber beneath provided with a removable bottom and a filter-bed, and a suitable pipe connection between the separating-vessel and said auxiliary chamber in its bottom, substantially as and for the purpose set forth.

In testimony whereof I affix my signature in presence of two witnesses.

DONALD DENNES.

Witnesses:
 ISHAM R. HOWZE,
 G. J. ROELAUDET.